(12) United States Patent
Haro et al.

(10) Patent No.: US 11,587,591 B2
(45) Date of Patent: Feb. 21, 2023

(54) IDENTIFYING AND REMOVING RESTRICTED INFORMATION FROM VIDEOS

(71) Applicant: eBay Inc., San Jose, CA (US)

(72) Inventors: Antonio Haro, Walnut Creek, CA (US); Ellis Shui-Man Luk, San Francisco, CA (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 86 days.

(21) Appl. No.: 17/223,672

(22) Filed: Apr. 6, 2021

(65) Prior Publication Data

US 2022/0319551 A1 Oct. 6, 2022

(51) Int. Cl.

| | |
|---|---|
| *G11B 27/036* | (2006.01) |
| *G06F 16/683* | (2019.01) |
| *G06F 21/10* | (2013.01) |
| *G06N 3/08* | (2006.01) |
| *G06Q 30/06* | (2012.01) |
| *G10L 13/04* | (2013.01) |
| *G06Q 30/0601* | (2023.01) |

(52) U.S. Cl.
CPC ......... *G11B 27/036* (2013.01); *G06F 16/683* (2019.01); *G06F 21/10* (2013.01); *G06N 3/08* (2013.01); *G06Q 30/0633* (2013.01); *G10L 13/04* (2013.01); *G06F 2221/0704* (2013.01)

(58) Field of Classification Search
None
See application file for complete search history.

(56) References Cited

U.S. PATENT DOCUMENTS

| 7,707,224 B2 | 4/2010 | Chastagnol et al. |
| 9,373,320 B1 | 6/2016 | Lyon et al. |
| 2013/0338806 A1* | 12/2013 | LaRosa ................. G11B 27/28 |
| | | 700/94 |

(Continued)

FOREIGN PATENT DOCUMENTS

| EP | 3640943 A1 | 4/2020 | |
| KR | 20140137219 A | * 12/2014 | ........... H04N 21/433 |

OTHER PUBLICATIONS

About Simon | Simon, Retrieved from the Internet URL: https://simon.kde.org/, 2 pages.

(Continued)

*Primary Examiner* — Gelek W Topgyal
(74) *Attorney, Agent, or Firm* — Shook, Hardy & Bacon L.L.P.

(57) ABSTRACT

A video is provided to viewers using a web-based platform without restricted audio, such as a copyrighted soundtrack. To do so, a video comprising at least two audio layers is received. The audio layers can include separate and distinct audio layers or a mix of audio from separate sources. A restricted audio element is identified in a first audio layer and a speech element is identified in a second audio layer. A stitched text string can be generated by performing speech-to-text on both audio layers and removing the text corresponding to the restricted audio element of the second audio layer. When playing back the video, a portion of the video is muted based on the restricted audio element. A voice synthesizer is employed to generate audible sound during the muted portion using the stitched text string.

20 Claims, 7 Drawing Sheets

(56) References Cited

U.S. PATENT DOCUMENTS

2017/0256271 A1    9/2017  Lyon et al.
2019/0311301 A1*  10/2019  Pyati ..................... G06F 16/901
2022/0115000 A1*   4/2022  Beaufays .............. G10L 13/047
2022/0130372 A1*   4/2022  Obaidi ................ G06F 21/6254

OTHER PUBLICATIONS

"Create a Custom Voice Speech service," Azure Cognitive Services, Microsoft Docs, MS, Retrieved from the Internet URL: https://docs.microsoft.com/en-us/azure/cognitive-services/speech-service/how-to-custom-voice-create-voice#build-your-custom-voice-model, Nov. 4, 2019, 14 pages.

Romero,"Convert Video Speech to Text with Watson," IBM Watson Media, Retrieved from the Internet URL: https://blog.video.ibm.com/streaming-product-updates/convert-video-speech-to-text-with-watson/, May 22, 2020, 6 Pages.

Extended European search Report received for European Patent Application No. 22166626.6, dated Aug. 29, 2022, 6 Pages.

\* cited by examiner

IDENTIFYING AND REMOVING RESTRICTED INFORMATION FROM VIDEOS

BACKGROUND

Many websites allow third parties to upload video content. Some of these websites actively seek to identify and remove video content that includes restricted information, such as copyrighted music. Copyrighted music sometimes appears advertently as some third parties incorporate music they do not have rights to within a video. In other case, it appears inadvertently in the background of the video. Traditional technology will flag a video and perhaps prohibit the video from being uploaded to the website upon detection of restricted information, like copyrighted music. Some websites require the user to post a disclaimer before uploading the video.

SUMMARY

At a high level, aspects described herein relate to providing videos with restricted audio. One method includes identifying a restricted audio element in a first audio layer and a speech element in a second audio layer of a video. In an example, this might occur where a user creates video content that includes some restricted audio, such as a copyrighted soundtrack.

Based on the first audio layer comprising the restricted audio element, the audio, including the first and second layers, is muted when the video is played. By doing this, the restricted audio element is not present in the playback of the video at a user interface of a computing device.

So that others might still be able understand the content of the video without the restricted audio element, a speech synthesizer is initiated to generate audible speech that corresponds to the speech element of the second audio layer. The speech synthesizer provides the audible speech during a portion of the video that has been muted. In this way, a user can watch the video without hearing the restricted audio element, yet still be able to understand the content of the video, as the speech synthesizer provides the audible speech from the speech element.

In addition to or in lieu of initiating the speech synthesizer, text may be provided during playback in order to provide the content of the speech element without the restricted audio element. To do so, a text string is generated using a speech-to-text model, and the text string that is generated includes a first set of text representing the first audio layer and a second set of text representing a second audio layer. The text string is generated such that the first set of text is dispersed among the second set of text within the text string. This pattern can occur when the restricted audio element and the speech element concurrently occur in the video.

From the text string, a stitched text string is generated. This is done by stitching the second set of text representing the second audio layer and excluding the first set of text from the first audio layer. In this way, the stitched text string includes text corresponding to the speech element, but not the restricted audio element. The stitched text string can be provided for display at the user interface during the muted portion of the video.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
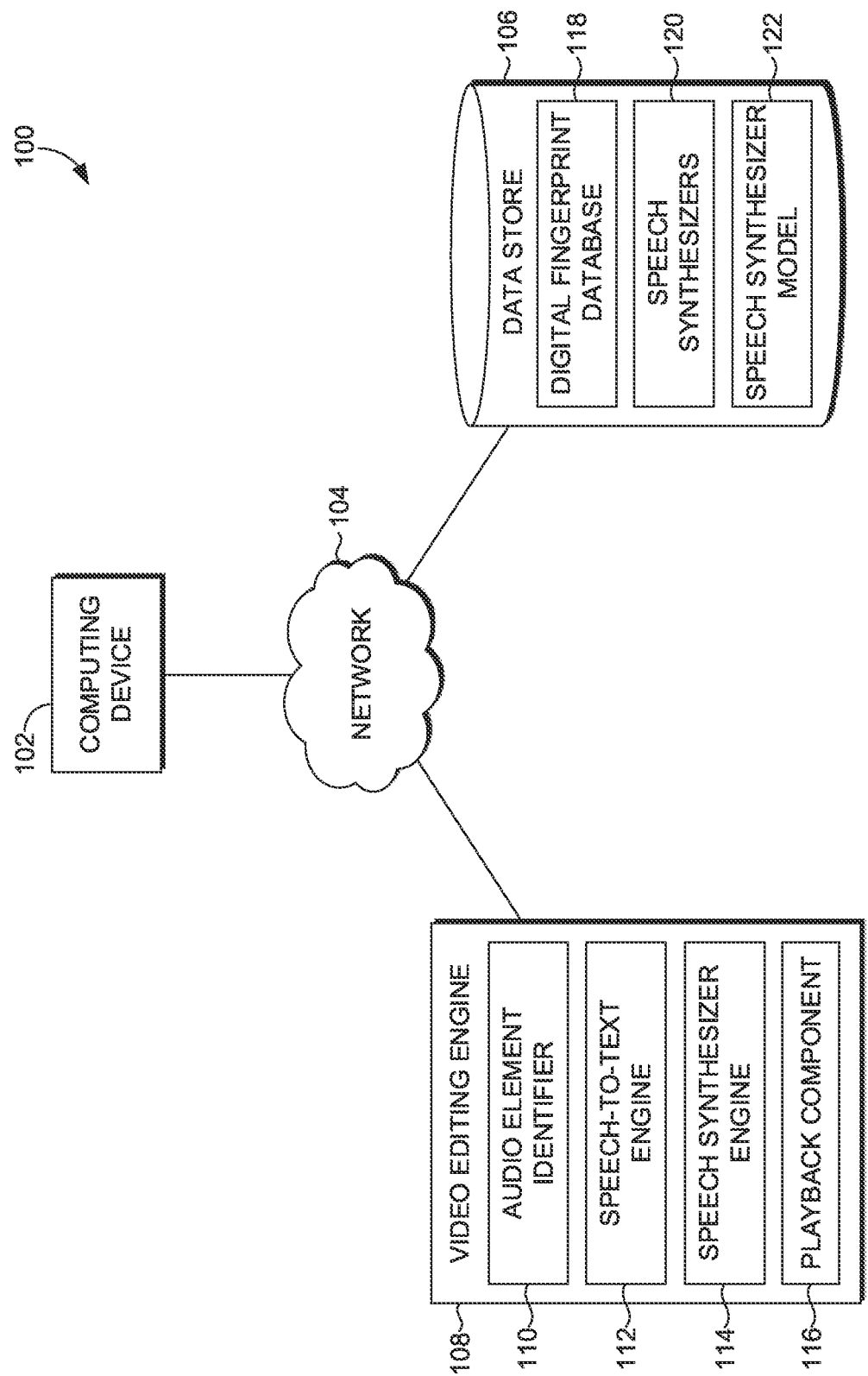
FIG. 1 is an example operating environment comprising an example video editing engine, in accordance with an aspect described herein.

Some websites that allow users to upload video content try to keep restricted content, such as copyrighted information, from being uploaded, as these websites host platforms that allow other uses to access the video content.

However, preventing restricted video content is challenging for websites. In particular, some websites have become so large and the content so vast that it is impossible to review every single minute of video to determine whether it includes restricted content. In 2019, a popular internet-streaming website experienced an average volume of 720,000 hours of video content uploaded every day.

To help identify restricted content, these large web-based platforms rely on artificial intelligence. In other cases, these platforms rely on individual users to flag videos. Once identified, the websites will often pull the videos for additional human review or will prohibit the video from being offered on the site altogether. In many cases, these websites will then take action against the uploading user in an attempt to proactively prevent future restricted content.

In most cases, a result of these traditional methods is that uploading users will have to re-upload video content without the restricted portions should these users still wish to have their videos made public by the host platform. Many times, this requires the user to redo the video content, which might not be possible to recreate. Further, false positive indications of restricted content by some artificial intelligence engines result in some users being erroneously subjected to the platform's preventative measure actions, inadvertently jeopardizing additional, historic video content by the user that does not include restricted video content.

The technology of the present disclosure resolves these problems, and more, that are inherent in traditional practices. In particular, the technology provides a mechanism by which restricted elements from a video can be removed, yet still provide the video content in a manner where viewers are still able to understand the context of the video.

By doing this, the user is now no longer required to recreate the video without the restricted content. In cases where the video cannot be recreated, such as a one-time event captured on video, the video can still be uploaded and shared so that viewers are able to watch the video and understand the context.

Another benefit arises from the false flag scenario, where the artificial intelligence or a person erroneously identifies a video as including restricted content. In such cases, the edits made to the video using the technology provided in this disclosure can be employed, as opposed to restricting the video upload or its sharing, or taking some action against the user. By using the present technology, even if there is a portion of the video that somehow was subject to a false flag, then the video is still uploaded and provided to viewers in a way that maintains the context of the content. As such, the technology provided in this disclosure can be used as an alternative to the flagging and restricting methods of the traditional technology that subjects users to potential penalties and restricts one-and-only content.

The disclosed methods include benefits over prior editing methods that remove one type of sound because this is computationally intensive and often does not yield perfect results, usually still requiring a human to review and manipulate some portions of the audio. Further, using these traditional methods, removal of sound data from one source can distort the sound from a second source during playback. The disclosed method is far less computationally intensive because it can mute both layers and use a speech synthesizer to generate audio corresponding to the speech element, which often times can be more realistic than audio that has been edited to remove some sound sources but leaves others. This becomes even more realistic for implementations that train speech on the user's speech from the speech element to generate the audio.

One example method that can be employed to effect these benefits over the traditional methods begins by receiving a video. In one particular scenario, a user provides the video using a computing device, and the video includes an audio portion. The audio portion comprises at least two audio layers. As will be described, these audio layers can be distinct or combined into a single audio output. Comprised within the at least two audio layers includes a first audio layer comprising a restricted audio element and a second audio layer comprising a speech element.

To put this as an example, the user uploading the video may be taking a video of an object and describing the object of the video. This might occur if the user were taking a video of an item to post it for sale on an item listing platform. However, as the user is describing the item, a copyrighted sound track is playing in the background. In this case, the audio includes the first audio layer having the restricted element, i.e., the copyrighted soundtrack, while the second audio layer comprises the speech element of the user describing the item.

To identify the restricted element, such as a restricted audio element, of the first audio layer, the audio, or a layer thereof, can be compared to content of a digital fingerprint database. The digital fingerprint database comprises large quantities of restricted content and compares the restricted content to the audio to identify a match between the audio and the restricted content. Upon identifying a match, the digital fingerprint database can indicate the match, thus identifying the audio layer as comprising a restricted audio.

When a portion of the video has been identified as including a restricted audio element, then the audio is muted during this portion. For instance, if the first audio layer comprises the restricted audio element, then the first audio layer and the second audio layer can be muted during this portion of the video. By muting, the video is edited to remove the audio.

To help maintain the context of the video, while not providing the restricted audio element, a speech synthesizer can be initiated during the portion of the video that has been muted. The speech synthesizer receives as an input the speech element of the second audio layer and communicates for an audible projection a synthesized speech that corresponds to the input speech element. For example, if the second audio layer comprises a speech element of "This item is a new, limited edition model vehicle," then the speech synthesizer can generate a synthesized speech element corresponding to this statement, such that during playback of the video, the audible sound being projected by a speaker is a synthesized audible speech saying, "This item is a new, limited edition model vehicle." In this way, the user hears the synthesized speech during the muted portion, thus providing context of the video without the restricted audio element, as this has been muted.

To further enhance the quality of the video during playback, a speech synthesizer model can be trained on the speech element. That is, the part of the audio, such as the second audio layer, that corresponds to the user's speech— the speech element—can be used as an input to train the speech synthesizer model. Thus, the output trained speech synthesizer model has been trained on audible speech features included in the speech element, thereby generating a trained speech synthesizer model that can be employed as the speech synthesizer that more closely correlates to the features of the speech in the video.

In addition to or in lieu of training the speech synthesizer model, a voice speech synthesizer can be selected from among a set of speech synthesizers based on the audible speech features of the speech element of the second audio layer. That is, based on the language, pitch, and tone, among other possible features, a voice synthesizer can be selected. For instance, the speech element might have features indicative of a female speaking English with a British accent. A voice synthesizer matching this can be selected and employed.

Another method, which can be employed alone or in combination with the foregoing method of using the voice synthesizer, that helps maintain context of the video during the muted portion uses visual text provided at the display. For instance, a speech-to-text model can be used to generate a text string from the video. Where the restricted audio element and the speech element occur concurrently in the video, sometimes the resulting text string can comprise a first set of text representing the first audio layer and a second set of text representing the second audio layer that are interspersed.

Thus, to provide the video context based on the audio, a stitched text string is generated by removing the text corresponding to the restricted audio element of the first audio layer and forming the stitched text string from the remaining text corresponding to the speech element of the second audio layer. The stitched text string can then be provided at a display of a computing device during the time in which the audio has been muted. In this way, a viewer can see the content of the speech element using the text without hearing or seeing the restricted speech element.

It will be realized that the method just described is only an example that can be practiced from the description that follows, and it is provided to more easily understand the technology and recognize its benefits. Additional examples are now described with reference to the figures.

Turning now to FIG. 1, FIG. 1 illustrates example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples.

Among other components or engines not shown, operating environment 100 comprises computing device 102. Computing device 102 is shown communicating using network 104 to data store 106 and video editing engine 108.

Computing device 102 may be a device that corresponds to the computing device 700 described with reference to FIG. 7. In implementations, computing device 102 may be a client-side or front-end device, while in other implementations computing device 102 represents a back-end or server-side device. As will be discussed, computing device 102 may also represent one more computing devices, and as such, some variations of the technology comprise both a client-side or front-end device, and a back-end or server-side computing device performing any combination of functions that will be further described.

Network 104 may comprise one or more networks (e.g., public network or virtual private network "VPN") as shown with network 104. Network 104 may include, without limitation, one or more local area networks (LANs), wide area networks (WANs), or any other communication network or method. Computing device 102 may be a client-computing device that corresponds to the computing device described herein with reference to FIG. 7.

Data store 106 generally stores information including data, computer instructions (e.g., software program instructions, routines, or services), or models used in embodiments of the described technologies. Although depicted as a single database component, data store 106 may be embodied as one or more data stores or may be in the cloud.

Video editing engine 108 generally provides videos that do not include restricted elements when played. Video editing engine 108 could be employed by a web-based platform that receives video from users and provides the video to other viewers. By using video editing engine 108, the restricted elements may not be provided to the other viewers when viewed.

In a particular implementation, video editing engine 108 is employed by a web-based item listing platform that lists items for sale. For some item listing platforms, videos are uploaded during an item listing process offered by the platform. That is, the item listing platform can offer an item listing process for a user to list items on the platform, and in part, the item listings can include video comprising the item.

Video editing engine 108 may receive a video. The video can be received from a computing device. The video may be included as part of a video file that comprises a video element and at least two audio layers.

In the context of this disclosure, at least two audio layers is intended to mean audio data from at least two distinct sources. It will be understood that, when audio data is received as part of the video file, the audio data may include separate and distinct audio layers from two distinct sources. This might occur where multiple microphones are used and the data for each microphone is separately written and combined for playback. In another case, the separate and distinct audio layers might arise from a user doing a post hoc edit of a video and overlaying audio into the video file. In other cases, however, the audio may simply comprise audio data from distinct sources; however, the audio data from these sources is combined when written to a file. That is, the audio data may not be separable into distinct audio layers based on the manner in which it was created, or at least not separable without a significant amount of modification. However, where the audio data still comprises data written from distinct audio sources, such as a human voice speaking and music playing in the background, the video file comprising the video and the audio is said to include at least two audio layers. Implementations of the technology provided herein may be used when the at least two audio layers are separate and distinct, or when the at least two audio layers are combined but correspond to audio that originated from two distinct sources.

Figure 2:
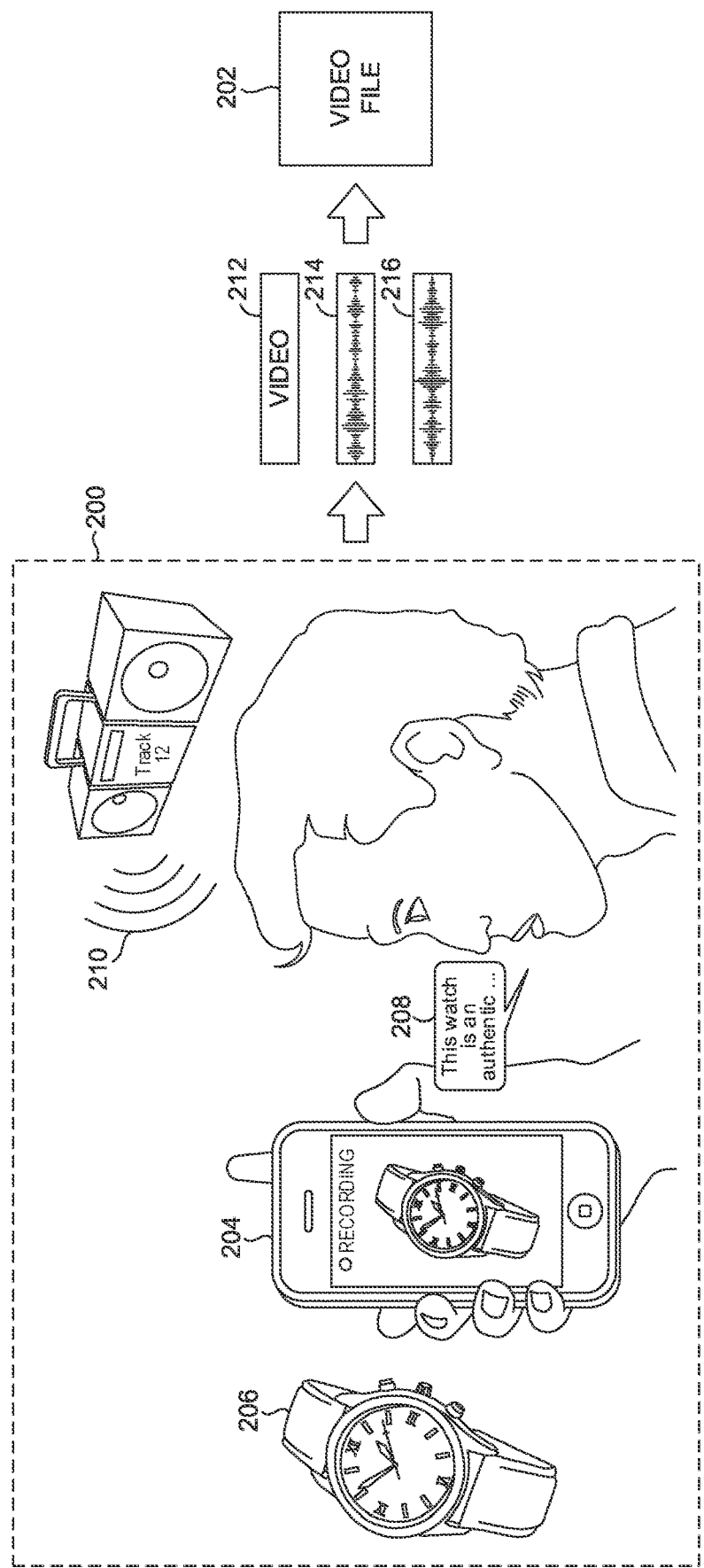
FIG. 2 is an illustrative scenario in which a video file is created having a restricted audio element and a speech element, in accordance with an aspect described herein.

To provide some context for this, and to also provide one example that can be used in understanding other aspects and functions of the technology, FIG. 2 has been provided to illustrate an example scenario 200 in which video file 202 is created.

With brief reference to FIG. 2, scenario 200 comprises computing device 204 that is being used to record a video of item 206. As noted, this could be done as part of an item listing process for listing item 206 on a web-based item listing platform. However, it will be understood that this is only one example use case of the technology, and that the technology may be used in other scenarios as well, many of which are not discussed for the sake of brevity.

In recording the video of item 206, computing device 204 may be utilizing a camera as in input component communicatively coupled to computing device 204 to record video data, while also utilizing one or more microphones as an input component communicatively coupled to computing device 204. In this illustration, the one or more microphones are being used to record audio data from two distinct sources. The first distinct source is originating as human speech and comprises speech element source 208. Here, the audio data associated with speech element source 208 corresponds to the human speech for, "This watch is an authentic . . . ."

Additionally, in scenario 200, the two distinct sources also include audio originating from a copyrighted soundtrack ("Track 12") that is playing in the background and being picked up by the one or more microphones. Here, restricted audio element source 210 is provided to illustrate the audio of the copyrighted soundtrack captured while recording the video of item 206. As illustrated, video data captured by the camera is provided as video 212, while audio data from speech element source 208 is provided as speech element 214 and audio data from restricted audio element source 210 is provided as restricted audio element 216. Each of the data associated with video 212, speech element 214, and restricted audio element 216 is written to video file 202 in this example. It will be understood, that in some cases, while speech element source 208 and audio element source 210 originate simultaneously in scenario 200, data associated with these two distinct sources could originate at different times, such as if a user were to later edit a video so that it includes a copyrighted soundtrack in addition to the user's speech. Such methods can also be used to generate video files suitable for use with the technology.

Turning back now to FIG. 1, to provide a video without a restricted element when played, such as playing back the video recorded in scenario 200 without restricted audio element 216, some implementations of video editing engine 108 employ audio element identifier 110, speech-to-text engine 112, speech synthesizer engine 114, and playback component 116.

In general, audio element identifier 110 identifies audio elements from a video file, such as video file 202 of FIG. 2, or from an audio file. For instance, the audio file may comprise data associated with distinct audio sources without video data and be treated by video editing engine 108 similar to a video file.

Audio element identifier 110 can identify an audio layer as comprising a restricted audio element. One example method for identifying the restricted audio element is to compare the audio layer to digital fingerprint database 118. As noted, the compared audio layer may be a separate and distinct audio layer from other audio data. In another implementation, the audio layer is illustrative of data written from a distinct audio source. In either case, the audio layer can be provided to or compared to digital fingerprint database 118, as generally, only a portion of the audio is needed to make the comparison within digital fingerprint database 118.

Digital fingerprint database 118 may include a database of known restricted elements. For instance, this may include copyrighted information, such as music, text, images, and so forth. Digital fingerprint database 118 can be a database indexing the known restricted elements to which audio elements may be compared. In some instances, the comparison is performed by matching language or words determined from the audio layer to the known restricted elements of digital fingerprint database 118. This can be performed by converting the audio layer into text corresponding to and representative of the audio layer using speech-to-text engine 112, which will be further discussed. In addition to or in lieu of this, a sound profile, e.g., the fingerprint of the sound, can be used to match the audio layer to a restricted element in the database by comparing audio signals of the audio layer to audio signals of the digital fingerprint database. Having identified a match between the audio layer and a known restricted audio element of digital fingerprint database 118, digital fingerprint database 118 provides an indication that the audio layer comprises a restricted audio element. In one case, the indication includes providing the matching known restricted element. As such, audio element identifier 110 identifies the audio layer as comprising a restricted audio element.

Audio element identifier 110 can identify an audio layer as comprising a speech element. As an example, a deep neural network can be trained to identify human speech within the audio layer of the video or audio file. To do so, the deep neural network can be trained using, as an example, WebRTC VAD provided by Google. Upon training, the video or audio, or a portion thereof, can be provided as an input to the trained deep neural network that outputs an indication of the speech element of the audio layer of the provided video or audio. Other machine learning models may be used to classify an audio element as a speech element in an audio layer and are intended to be within the scope of this disclosure.

Speech-to-text engine 112 generally generates text from speech. More specifically, speech-to-text engine 112 generally converts audio data corresponding to human speech into text representative of the human speech.

Speech-to-text engine 112 may be employed upon detection of human speech in the video by audio element identifier 110. In some cases, speech-to-text engine 112 is employed when there is an indication that a portion of audio within a video comprises a restricted audio element. Employing speech-to-text engine 112 upon detection of a restricted audio element can be beneficial in some circumstances, as the engine can begin to analyze the portion of the video that includes the restricted audio element, but does not have to analyze the entire video. Thus, while speech-to-text engine 112 could be configured to analyze the entire audio of the video, it can also be implemented only when audio element identifier 112 classifies an audio layer as including a restricted element.

Speech-to-text engine 112 can employ a trained algorithm to convert the audio data into text representative of the human speech. One of ordinary skill in the art will appreciate that there are currently trained models suitable for use by speech-to-text engine 112. To provide a non-limiting example, IBM's Watson's Speech to Text may be suitable. An open source option, as of the filing of this disclosure, may include Simon, as Simon uses the KDE libraries, CMU SPHINX or Julius coupled with an HTK (hidden Markov model toolkit). It will be understood that these are just a couple of examples that could be employed and that others are also available and will become available.

By employing such a model, speech-to-text engine 112 inputs an audio layer and outputs a text string corresponding to and representative of the human speech within the audio layer. In an example, one audio layer that comprises the speech element and does not comprise the restricted audio element is provided as an input to speech-to-text engine 112 and a text string that includes text of the speech element but not that representative of the restricted audio element is generated as the output. The text string can be used by speech synthesizer engine 114 or playback component 116, which will be discussed in more detail.

In some implementations, the audio data from both the at least two audio layers, including an audio layer comprising a restricted audio element and an audio layer comprising the speech element, is provided as an input to speech-to-text engine 112. In cases where both the restricted audio element and the speech element comprise human speech, the text string comprises text representative of the restricted audio element that is interspersed among text representative of the speech element. Said differently, speech-to-text engine 112 can generate a text string comprising a first set of text representing a first audio layer that includes a restricted audio element and a second set of text representing a second audio layer that includes a speech element of a video, where the first set of text is dispersed among the second set of text within the text string.

Speech-to-text engine 112 may form a stitched text string from the text string to provide text representative of the audio layer comprising the speech element, while excluding text that is representative of the audio layer comprising the restricted audio element. As an example, speech-to-text engine 112 may form the stitched text string by stitching together text representing the speech element such that the stitched text string excludes text representing the restricted audio elements.

When forming the stitched text string, speech-to-text engine 112 may utilize information provided by digital fingerprint database 118. As noted, audio element identifier 110 may identify an audio layer as comprising a restricted audio element based on an indication provided by digital fingerprint database 118 of a matching known restricted element. Speech-to-text engine 112 may utilize the known restricted element within digital fingerprint database 118 that is identified as a match to remove portions of the text string representing the restricted audio element. That is, a comparison of the text string to the matching known restricted element is made to identify text elements in the text string that correspond to text elements in the known restricted element. The corresponding text can be removed. Once removed, the remaining text comprises text associated with the speech element. The remaining text is stitched in the original order of the remaining text without the removed text associated with the restricted audio element to form the stitched text string.

Figure 3:
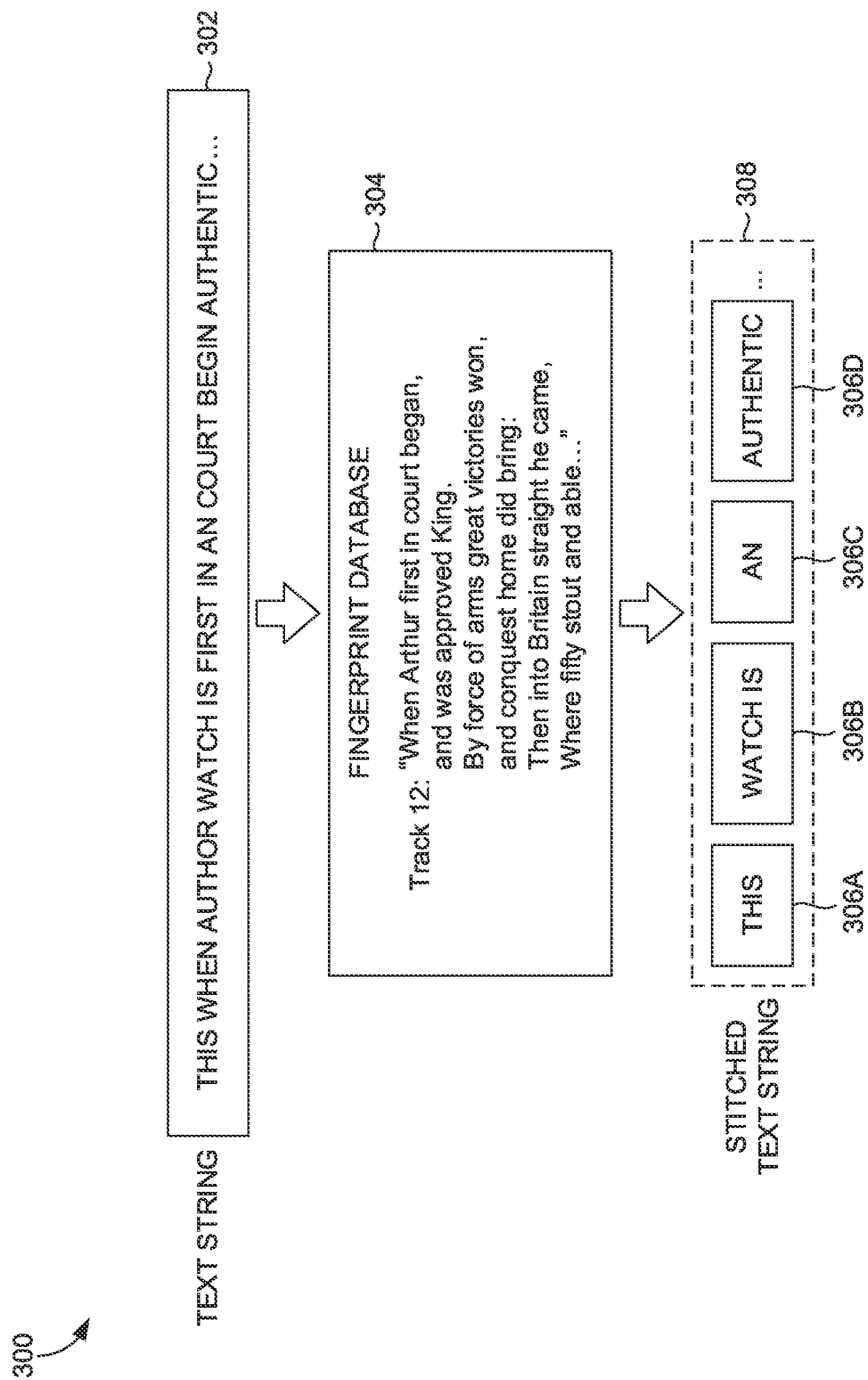
FIG. 3 is an example illustration of a stitched text string formed from the speech element of FIG. 2, in accordance with an aspect described herein.

This example method is illustrated using FIG. 3. In general, FIG. 3 is an example illustration 300 of forming stitched text string 308. In particular, illustration 300 depicts forming stitched text string 308 from text string 302 that is generated from video file 202 of FIG. 2. As previously noted, video file 202 comprises speech element 214 and restricted audio element 216. From the audio layers corresponding to speech element 214 and restricted audio element 216, speech-to-text engine 112 has generated text string 302. Text string 302 comprises text corresponding to speech element 214 that is dispersed among text corresponding to restricted audio element 216.

In this example, an audio layer associated with restricted audio element 216 has been identified as matching at least a portion of text corresponding to Track 12 of fingerprint database 304. Speech-to-text engine 112 compares the text of Track 12 of fingerprint database 304 to the text of text string 302 and removes text from text string 302 that corresponds to the text of Track 12 of fingerprint database 304. After the removing, the corresponding text, the remaining text, illustrated as text elements 306A—D, is stitched together to form stitched text string 308. As shown, stitched text string 308 comprises text that corresponds to speech element 214, while excluding text from restricted audio element 316.

With primary reference again to FIG. 1, speech synthesizer engine 114 generally employs a speech synthesizer to generate audio that can be provided at playback. Speech synthesizer engine 114 may select and employ any of speech synthesizers 120 stored in data store 106. Speech synthesizer 120 may comprise a text-to-speech model. Various models are known in the art. Each model can include a set of features associated with the type of speech provided by the text-to-speech model of the speech synthesizer. Some example features can include pitch, speed, inflection, accent, gender, language, and the like, which are defined by the sound profile, including wavelength, amplitude, frequency, and the like.

Speech synthesizer engine 114 may select from among a plurality of speech synthesizers, each associated with a text-to-speech model having different features, and included among speech synthesizers 120. The selection can be based on speech features associated with a speech element of an audio layer. That is, the speech features of the speech element are determined by speech synthesizer engine 114 using the sound profile of the speech element. Speech features can then be matched to similar features of a text-to-speech model of a speech synthesizer.

In some implementations, speech synthesizer model 122 is trained. Speech synthesizer engine 114 can train speech synthesizer model 122 using the audio layer of the speech element. In this way, a speech synthesizer employing the trained speech synthesizer model might more closely match the characteristics of human speech than a text-to-speech model that is built using different sound characteristics or profiles. Among others, one example of a speech synthesizer model that can use the audio layer comprising the speech element as training data includes Custom Voice by Microsoft. Once trained, the trained speech synthesizer model can be used by speech synthesizer engine 114 to generate audio corresponding to the speech element. The trained speech synthesizer model can be stored as speech synthesizer model 122 and employed by speech synthesizer engine 114 or trained further on additional speech elements.

In one method, speech synthesizer engine 114 generates the audio by using the text-to-speech model of the speech synthesizers or the trained speech synthesizer model. As noted above, speech-to-text can be employed to generate text from a separate and distinct audio layer comprising the speech element. The text string generated in this case can be the input used by speech synthesizer engine 114 to generate audio. In implementations where the audio layers are not separate and distinct, but still include at least two audio layers from at least two distinct sources, a stitched text string can be the input used by speech synthesizer engine 114 to generate audio.

Playback component 116 generally provides an edited video. In some implementations, playback components edit a video to generate an edited video and the edited video is saved such that the edited video can be played. For instance, the edited video might be streamed from a web-based platform. In other implementations, edits to the video are made while the video is streaming, thereby keeping the saved version of the video intact.

Edits to the video by playback component 116 include muting the audio. The audio, including one or more audio layers of the audio, can be muted during a portion of the video where an audio layer comprises a restricted audio element, as identified using audio element identifier 110. Playback component 116 may edit the video by initiating a speech synthesizer or a trained speech synthesizer model selected or trained using speech synthesizer engine 114 to generate audible sound during the muted portion. As noted, playback component 116 may edit and save the video as an edited video or make edits to the video at the time in which the now edited video is being provided.

Figure 4:
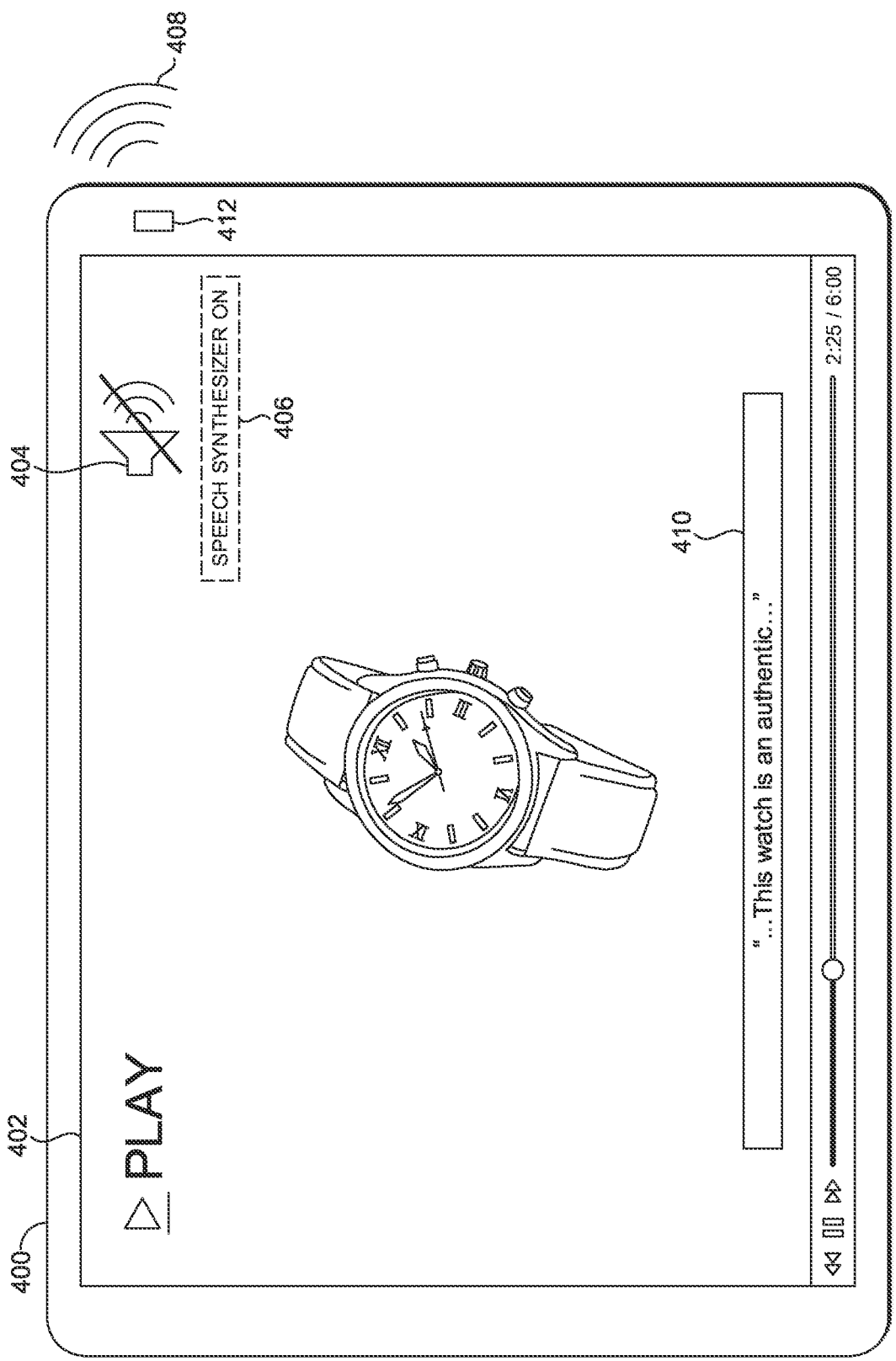
FIG. 4 is a computing device playing a video without the restricted audio element of FIG. 2, in accordance with an aspect described herein.

FIG. 4 provides an example illustration of an edited video being played at computing device 400, where the edited video does not include a restricted audio element. The video is being provided for display at display 402 by way of a graphical user interface. As an example, icon 404 is intended to illustrate that the original one or more audio layers are being muted based on the identification of a restricted audio element included in one of the audio layers. That is, a first audio layer comprising a restricted audio element and a second audio layer comprising a speech element can both be muted during a portion of the video that comprises the restricted audio element.

As also illustrated, a speech synthesizer has been initiated to generate an audible sound corresponding to the speech element. The speech synthesizer can be initiated during the portion of the video that is being muted, either during a pre-editing process or during the time playback component 116 is providing the video. This initiation and use of the speech synthesizer to generate audible sound during the muted portion is represented using box 406 to illustrate the speech synthesizer was or is active during this portion of the video. The speech synthesizer generates the audible sound for the speech elements, which is projected using speaker 412 communicatively coupled to the computing device. The projection of sound corresponding to the speech element is illustrated by audible signal 408, which corresponds to text string 410, "This watch is an authentic . . . ." Text string 410 may be provided in addition to or in lieu of audible signal 408. Text string 410 can illustrate a stitched text string, such as that corresponding to stitched text string 308 of FIG. 3, or may be a text string generated by speech-to-text engine directly from the audio layer comprising the speech element.

With reference back to FIG. 1, it is again noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Further, many of the elements described with respect to FIG. 1 are functional entities, such as those described in relation to video editing engine 108, which may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Figure 5:
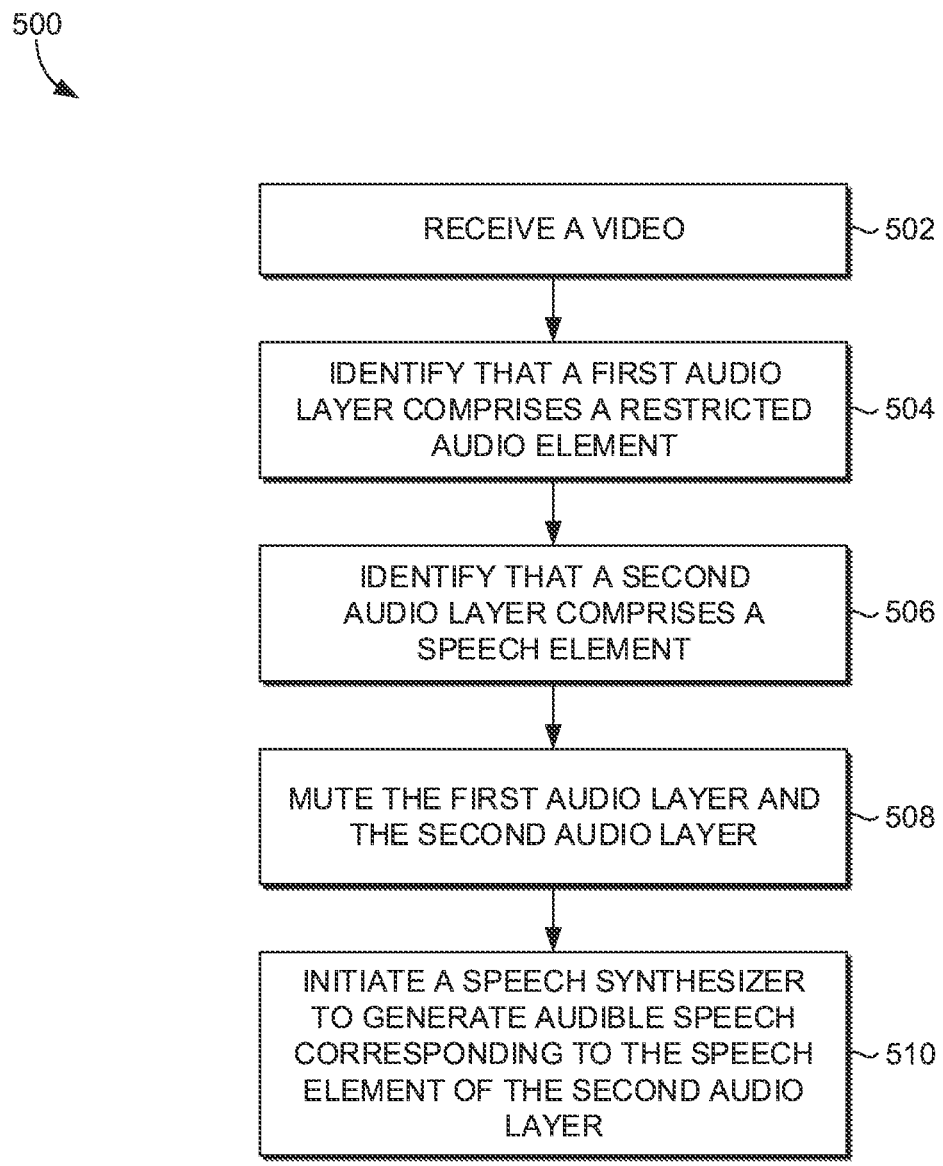
FIGS. 5-6 are block diagrams illustrating example methods for providing a video without restricted audio, in accordance with aspects described herein.
Figure 6:
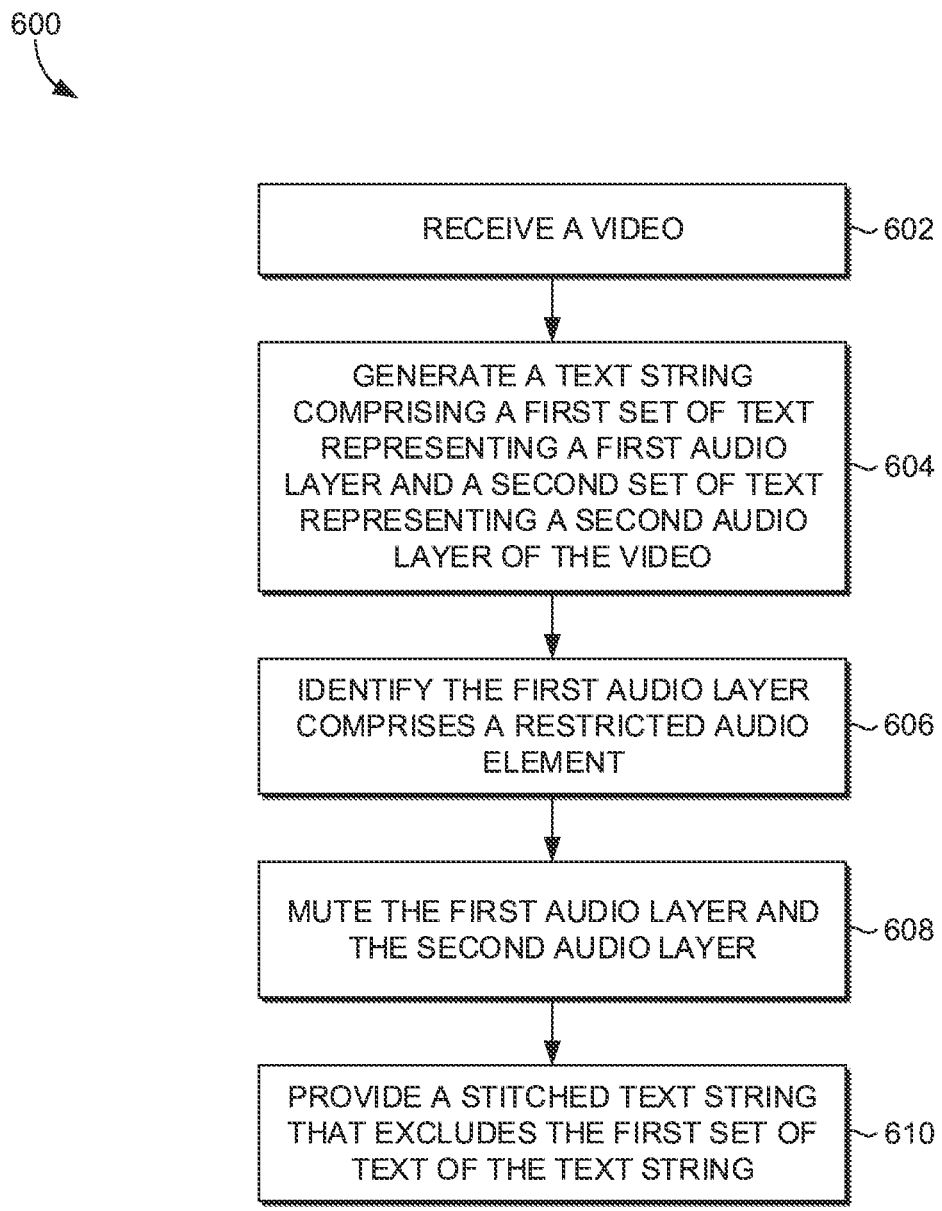

With reference to FIGS. 5-6, block diagrams are included to illustrate methods for providing a video without restricted audio elements. The methods may be performed using video editing engine 108 described herein. In embodiments, one or more computer storage media having computer-executable instructions embodied thereon that, when executed, by one or more processors, cause the one or more processors to perform operations of a method.

FIG. 5 is a block diagram of example method 500 for providing a video without a restricted audio element. At block 502, a video is received. The video may comprise at least two audio layers, which may be separate and distinct, or formed from more than one distinct audio source.

At block 504, a first audio layer is identified as comprising a restricted audio element. That is, the restricted audio element is identified from the audio and included within a first audio layer. Audio element identifier 110 can identify the restricted audio element by comparing the at least two layers, or the first layer individually if it is separate and distinct from the second layer, to a digital fingerprint database. In some instances, the at least two audio layers are provided to a digital fingerprint database that cause the digital fingerprint database to make a comparison to known restricted elements and indicate or provide a matching known restricted audio element, thereby indicating that the first audio layer of the at least two audio layers comprises the restricted audio element.

At block 506, a second audio layer is identified as comprising a speech element. Audio element identifier 110 can also be used to identify the speech element in the second audio layer. A trained machine learning algorithm, such as a deep neural network, can be trained to classify whether the second audio layer comprises the speech element. In some cases, speech-to-text engine 112 can be employed to generate text in the form of a text string or stitched text string that corresponds to and is representative of the speech element.

At block 508, the first audio layer and the second audio layer are muted. This can be performed during an offline process by playback component 116 that mutes a portion of the video having the restricted audio and stores this as an edited video. This may also be done by muting the portion of the video during playback. Both are intended to be included as an "edited" video. The portion of the video is muted based on the video comprising the restricted audio element of the first audio layer.

At block 510 a speech synthesizer is initiated to generate audible speech corresponding to the speech element of the second audio layer. This can be done by playback component 116 during the offline process or while the video is being played. The portion of the video during which the speech synthesizer is initiated and active comprises the portion having the restricted audio element. The speech synthesizer may be selected based on features of the speech elements, which can be compared to features of speech synthesizers among a plurality of speech synthesizers. This initiated speech synthesizer could comprise a trained speech synthesizer model that has been trained at least partially using the speech element of the second audio layer. In some implementations, the speech synthesizer uses as an input a text string or a stitched text string, either of which can be provided by a graphical user interface in addition to or in lieu of speech generated by the speech synthesizer.

With reference now to FIG. 6, an example method for providing a video without a restricted audio element is provided. At block 602, a video is received. At block 604, a text string is generated comprising a first set of text representing a first audio layer and a second set of text representing a second audio layer of the video. The text string can be generated using the speech-to-text engine of FIG. 2. In some cases, the first set of text is dispersed among the second set of text within the text string. This may occur where the first and second sources of the first and second audio layers are provided simultaneously.

At block 606, the first audio layer is identified as comprising a restricted audio element. This can be done using the methods previously discussed and performed by audio element identifier 110.

At block 608, the first audio layer and the second audio layer are muted. This can be done using playback component 116 during the offline process or at the time the edited video is being played. The muting of the first and second audio layers may be done based on identifying the restricted audio element.

At block 610, a stitched text string is provided. The stitched text string excludes the first set of text associated with the restricted element of the first audio layer. The stitched text string can be generated using speech synthesizer engine 114 by removing the first set of text and stitching together the remaining text, including the second set of text associated with the second audio layer and the speech element. The stitched text string can be provided by a graphical user interface at a display of a computing device. In some cases, a voice synthesizer is initiated, to generate audible sound using the stitched text string during the portion of the video that has been muted.

Having described an overview of the present technology, an example operating environment in which embodiments of the present technology may be implemented is described below in order to provide a general context for various aspects of the present technology. Referring initially to FIG. 7, in particular, an example operating environment for implementing embodiments of the present technology is shown and designated generally as computing device 700. Computing device 700 is but one example of a suitable computing environment and is not intended to suggest any limitation as to the scope of use or functionality of the technology. Neither should computing device 700 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Figure 7:
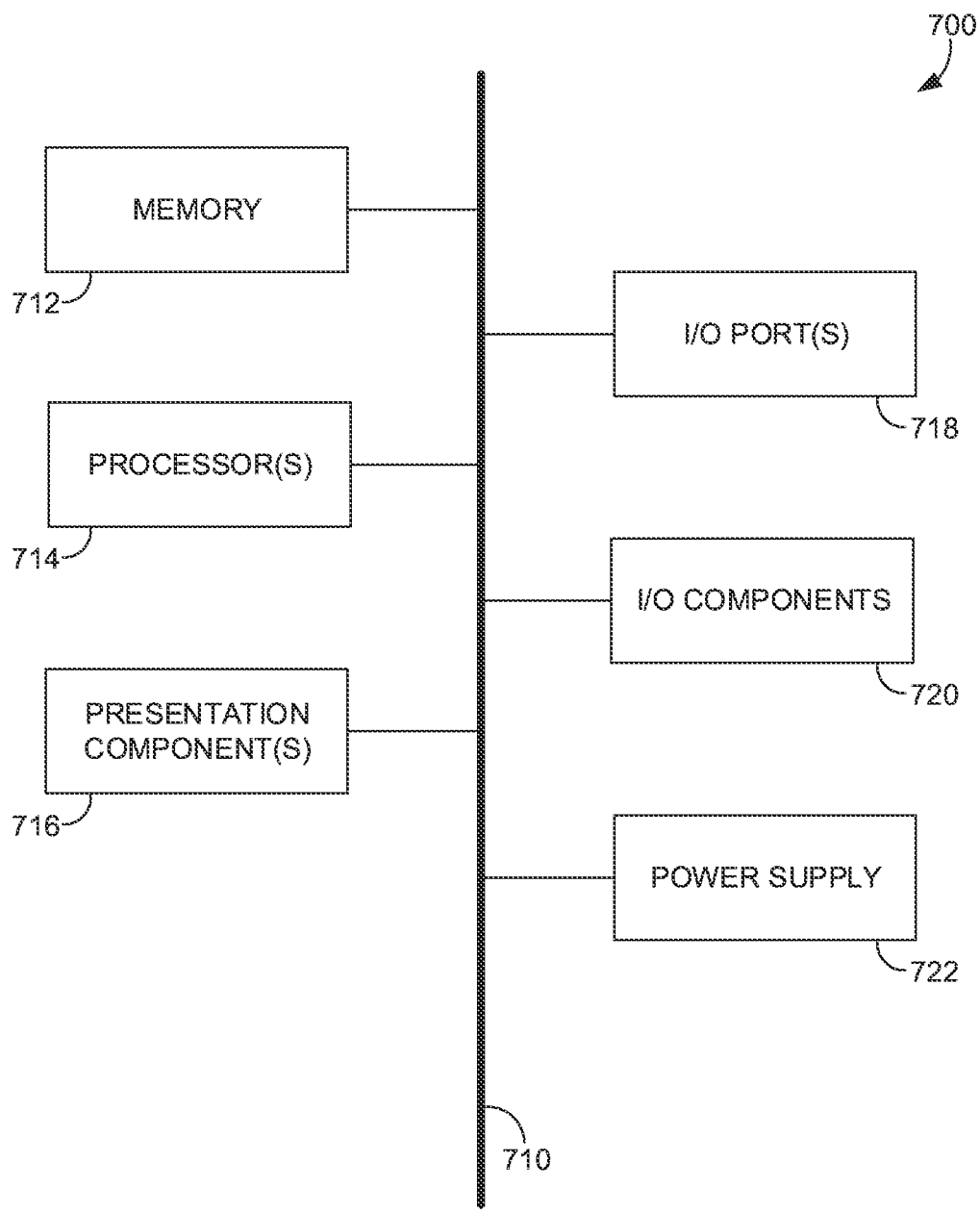
FIG. 7 is an example computing device suitable for employing aspects of the example video editing engine of FIG. 2, in accordance with an aspect described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 merely illustrates an example computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Examples of presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. Also, the word "initiating" has the same broad meaning as the word "executing" or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code.

Further, while embodiments of the present technology may generally refer to the video editing engine and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

One non-limiting example system that can be practiced from the foregoing description incudes a system for providing a video without restricted audio that comprises: at least one processor; and or more computer storage media storing computer-executable instructions that when executed by a processor, cause the processor to perform operations comprising: capturing a video comprising at least two audio layers, wherein a first audio layer comprises a restricted audio element and a second audio layer comprises a speech element; uploading the video to a web-based platform, wherein the web-based platform provides third-party web users access to the video; and while displaying the video at a graphical user interface, projecting an audible sound via a speaker, the audible sound determined by a speech synthesizer and corresponding to the second audio layer, wherein the audible sound is projected during a portion of the video in which the first audio layer and the second audio layer are muted based on the first audio layer comprising the restricted audio element.

What is claimed is:

1. A computer-implemented method for providing a video without restricted audio, the method comprising:
   receiving a video comprising at least two audio layers;
   identifying a first audio layer comprises a restricted audio element;
   identifying a second audio layer comprises a speech element;
   forming a stitched text string from the at least two audio layers of the video by removing text corresponding to the restricted audio element and stitching text corresponding to the speech element;
   based on the first audio layer comprising the restricted audio element, muting the first audio layer and the second audio layer of a portion of the video when the video is provided for display at a user interface; and
   initiating a speech synthesizer to generate audible speech corresponding to the stitched text string during the portion of the video in which the first audio layer and the second audio layer are muted.

2. The method of claim 1, wherein identifying the first audio layer comprises the restricted audio element by comparing the first audio layer to a digital fingerprint database.

3. The method of claim 2, further comprising receiving an indication from the digital fingerprint database that the first layer comprises a copyrighted soundtrack, and wherein identifying that the first audio layer comprises the restricted audio element is based on the indication of the copyrighted soundtrack.

4. The method of claim 1, wherein the video is received as part of an item listing process at an item listing platform listing items for sale, the video comprising an item for sale on the item listing platform.

5. The method of claim 1, further comprising selecting the speech synthesizer based on audible speech features in the second audio layer.

6. The method of claim 1, further comprising:
   training a speech synthesizer model using the second audio layer to generate a trained speech synthesizer model; and
   employing the trained speech synthesizer model as the speech synthesizer.

7. The method of claim 1, further comprising:
   generating a text string comprising a first set of text representing the first audio layer and a second set of text representing the second audio layer of the video, wherein the first set of text is dispersed among the second set of text within the text string; and
   forming the stitched text string comprises removing the first set of text and stitching the second set of text of the text string in an original order of the second set of text.

8. The method of claim 7, further comprising providing the stitched text string for display at the user interface during the portion of the video in which the first audio layer and the second audio layer are muted.

9. One or more computer storage media storing computer-executable instructions that when executed by a processor, cause the processor to perform a method of providing a video without restricted audio, the method comprising:
   receiving a video comprising at least two audio layers;
   generating a text string comprising a first set of text representing a first audio layer and a second set of text representing a second audio layer of the video, wherein the first set of text is dispersed among the second set of text within the text string;
   identifying the first audio layer comprises a restricted audio element;
   based on the first audio layer comprising the restricted audio element, muting the first audio layer and the second audio layer of a portion of the video when providing the video for display at a user interface; and
   providing for display at the user interface a stitched text string during the portion of the video in which the first audio layer and the second audio layer are muted, wherein the stitched text string is formed by stitching the second set of text of the text string such that the stitched text string excludes the first set of text of the text string.

10. The media of claim 9, wherein identifying the first audio layer comprises the restricted audio element by comparing the first audio layer to a digital fingerprint database.

11. The media of claim 10, further comprising receiving an indication from the digital fingerprint database that the first layer comprises a copyrighted soundtrack, and wherein identifying that the first audio layer comprises the restricted audio element is based on the indication of the copyrighted soundtrack.

12. The media of claim 9, wherein the video is received as part of an item listing process at an item listing platform listing items for sale, the video comprising an item for sale on the item listing platform.

13. The media of claim 9, further comprising initiating a speech synthesizer to generate audio based on the stitched text string during the portion of the video in which the first audio layer and the second audio layer are muted.

14. The method of claim 13, further comprising selecting the speech synthesizer based on audible speech features in the second audio layer.

15. A system for providing a video without restricted audio, the system comprising:
- at least one processor; and
- one or more computer storage media storing computer-executable instructions that when executed by a processor, cause the processor to perform operations comprising:
  - capturing a video comprising at least two audio layers, wherein a first audio layer comprises a restricted audio element and a second audio layer comprises a speech element;
  - communicating the video to a web-based platform that provides third-party web users access to the video, wherein communicating causes an edit to the video based on the first audio layer comprising the restricted audio element to generate an edited video, the edit of the edited video comprising muting the sound during a portion of the video comprising the restricted element of the first audio layer and inserting a synthesized audio from a speech synthesizer, the synthesized audio generated from a stitched text string, the stitched text string formed from the at least two audio layers by removing text corresponding to the restricted audio element and stitching text corresponding to the speech element; and
  - while playing the edited video at a graphical user interface, projecting an audible sound via a speaker, the audible sound comprising the synthesized audio.

16. The system of claim 15, wherein the web-based platform is a web-based item listing platform listing items for sale, and wherein the system further comprises initiating an item listing process at the web-based item listing platform, the video being captured as part of the item listing process and comprising an item for sale on the item listing platform.

17. The system of claim 15, further comprising, while capturing the video, providing the speech element of the second audio layer, wherein the speech element of the second audio layer causes training of a speech synthesizer model employed by the speech synthesizer.

18. The system of claim 15, further comprising, while capturing the video, providing the speech element of the second audio layer, wherein the speech element of the second audio layer causes a selection of the speech synthesizer based on audible speech features in the second audio layer.

19. The system of claim 15, further comprising, while the video is playing, providing for display at the graphical user interface the stitched text string.

20. The system of claim 15, wherein the restricted audio element of the first audio layer corresponds to a copyrighted soundtrack that is included within a digital fingerprint database.

* * * * *